United States Patent [19]

Miklos

[11] Patent Number: 4,479,579
[45] Date of Patent: Oct. 30, 1984

[54] NON-DUBLICABLE MAGNETIC DISK JACKET AND METHOD OF MANUFACTURE

[75] Inventor: Richard L. Miklos, Afton, Minn.

[73] Assignee: Minnesota Mining and Manufacturing Company, St. Paul, Minn.

[21] Appl. No.: 444,301

[22] Filed: Nov. 24, 1982

[51] Int. Cl.³ .................... B65D 73/00; B65D 85/30; B65D 85/57
[52] U.S. Cl. .................... 206/309; 206/312; 206/444; 206/459; 206/807; 283/74; 283/106
[58] Field of Search .............. 360/131, 135, 97, 15, 360/98–99, 133; 264/293, 132; 206/444, 309, 312, 459, 807; 283/74, 106

[56] References Cited
U.S. PATENT DOCUMENTS

| | | | |
|---|---|---|---|
| 1,989,724 | 2/1935 | Villanyi | 264/293 |
| 3,668,658 | 6/1972 | Flores et al. | 340/174.1 |
| 3,864,755 | 2/1975 | Hargis | 360/133 |
| 4,038,693 | 7/1977 | Huffine et al. | 360/99 |
| 4,064,206 | 12/1977 | Seufert | 264/293 X |
| 4,130,623 | 12/1978 | Walter | 264/293 |
| 4,170,683 | 10/1979 | Miklos | 428/336 |
| 4,223,050 | 9/1980 | Nyfeler et al. | 264/293 |
| 4,263,634 | 4/1981 | Chenoweth et al. | 360/133 |
| 4,279,852 | 7/1981 | Engelmann | 264/293 |

Primary Examiner—George G. Stellar
Attorney, Agent, or Firm—Donald M. Sell; James A. Smith; David W. Anderson

[57] ABSTRACT

A magnetic disk jacket which encloses and protects a magnetic disk is rendered duplication resistant by hot-stamp transfer printing an area of the jacket which cannot be supported in a flat or planar condition against the application of pressure after the jacket has been at least partially assembled, hot-stamp transfer printing an area of the jacket which extends across a portion of the jacket which is to be folded at assembly, or embossing an area of the jacket which will be superposed over a panel of the partially assembled disk jacket. The printed or embossed area may also identify information which should be present on the disk.

13 Claims, 6 Drawing Figures

NON-DUBLICABLE MAGNETIC DISK JACKET AND METHOD OF MANUFACTURE

BACKGROUND OF THE INVENTION

1. Field of the Invention

This invention relates to protective envelopes and, particularly, to magnetic recording disk jackets.

2. Description of the Prior Art

A flexible magnetic disk jacket encloses and protects a magnetic recording disk and is inserted along with the disk into a so-called disk drive which is connected to a computer system. The disk drive includes a read/write magnetic head which contacts the magnetic disk through openings in the jacket and either magnetically records onto the disk information supplied by the computer system or magnetically reads information from the disk and supplies such information to the computer system.

Recently, with the advent of small and relatively inexpensive home computer systems, a large market has been developed for prerecorded information or computer programs ("software") which may be read directly by the computer system rather than entered manually by the user. Such software is relatively expensive and easily duplicated and has given rise to an illicit market specializing in the unauthorized duplication and sale thereof. It is, therefore, necessary that users, distributors and manufacturers be provided with means for distinguishing authorized and illicitly produced software.

The present industry-accepted method of manufacturing a disk jacket is disclosed in U.S. Pat. No. 4,038,693 issued to Huffine et al. and U.S. Pat. No. 4,263,624 issued to Chenoweth et al. These patents disclose a disk jacket formed from a rectangular, perimeter cut sheet which includes three envelope-type flaps extending from the three edges of one-half of the rectangular sheet. The center line of the sheet is heated and folded to define top and bottom panels of the jacket and the two flaps adjacent this fold are in turn folded over the bottom panel and secured by an adhesive, thermal bonding or ultrasonic welding to form a pocket between the two panels. The magnetic disk is inserted into this pocket and the flap opposite the initial center-line fold is folded over and likewise secured to contain and protect the magnetic disk and form a completed jacket.

These jackets are available from manufacturers in a partially assembled form wherein all that needs be done to complete the assembly is insert the disk and fold and secure the final flap. Since the information recorded on a disk is easily duplicated onto another disk, illicit producers need only insert a duplicated disk into a partially assembled jacket and secure the final flap to produce a software package which is indistinguishable from an authorized package.

Alternative disk jacket constructions have been proposed by U.S. Pat. No. 3,864,755 which depicts a disk jacket having a relatively rigid, flat back cover and a relatively thin front cover which is thermoformed to accept the disk and bonded to the flat back cover and U.S. Pat. No. 3,668,658 in which the jacket is a composite of three sheets which include a central gasket layer surrounding the magnetic disk and adhesively attached to flat side panels.

SUMMARY OF THE INVENTION

The present invention discloses a method of forming a disk jacket which results in a jacket that includes a deformed area which would be difficult or impossible to duplicate after the jacket has been partially or completely assembled. The deformed area may also relate to and identify the information recorded on the disk.

The method of forming includes providing a flat stock material, hot-stamp transfer printing or embossing an area of the stock material, cutting the stock material to produce a disk jacket blank which includes the printing or embossment in a desired area, and assembling the jacket blank to form a jacket which is at least partially complete. The jacket thus produced includes hot-stamp transfer printing at an area of the jacket which cannot be supported in a flat or planar condition against pressure after the jacket has been at least partially assembled, hot-stamp transfer printing at an area which extends across a portion of the jacket which is to be folded at assembly, or a raised embossment extending from one panel of the disk jacket which is superposed over another panel of the partially assembled disk jacket.

BRIEF DESCRIPTION OF THE DRAWINGS

The present invention will be more thoroughly described with reference to the accompanying drawings wherein like numbers refer to like parts in several views, and wherein.

DESCRIPTION OF THE PREFERRED EMBODIMENTS

Figure 1:
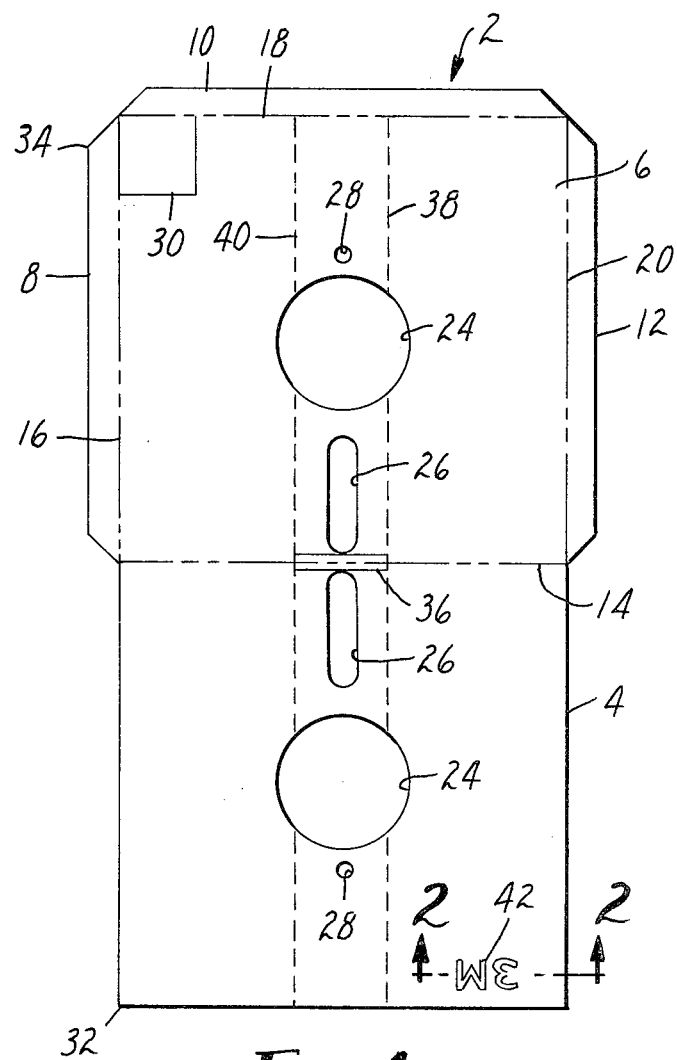
FIG. 1 is a plan view of a disk jacket blank incorporating various embodiments of the present invention.

With reference to FIG. 1 of the accompanying drawings, there is shown a flat disk jacket blank 2 which has been cut from a flat sheet of paper, polyethylene, polycarbonate or like material. The jacket blank 2 includes areas which may be designated as a bottom panel 4, a top panel 6 and edge flaps 8, 10 and 12 extending from the top panel 6. The bottom panel 4 and the top panel 6 are separated by a fold line 14, and the edge flaps 8, 10 and 12 are separated from the top panel 6 by fold lines 16, 18 and 20, respectively.

Figure 3:
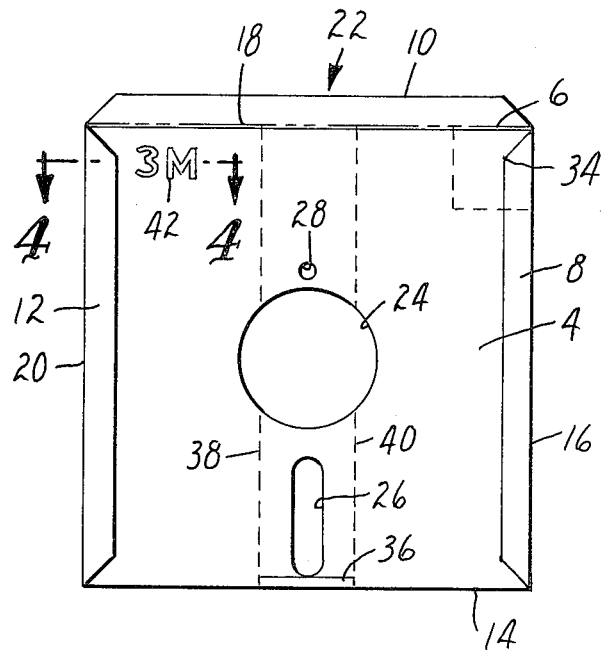
FIG. 3 is a plan view of the disk jacket blank of FIG. 1 in a partially assembled condition.

FIG. 3 illustrates a partially assembled disk jacket 22 which has been formed by folding the jacket blank 2 along the line 14 to superpose the bottom panel 4 and the top panel 6. The bottom panel 4 has been secured to the top panel 6 by folding the edge flaps 8 and 12 and attaching these flaps to the bottom panel 4 by a conventional method such as adhesive bonding, ultrasonic welding or thermal bonding. The partially assembled jacket 22 illustrated in FIG. 3 is in the form which is commonly supplied by jacket manufacturers to disk packagers. If a completed jacket 22 and disk (not shown) assembly were to now be produced, the disk would be inserted between the top panel 6 and the bottom panel 4 and the edge flap 10 would be folded over and attached to the bottom panel 4 in like manner as the edge flaps 8 and 12.

Opposite sides of the jacket blank 2 and the partially assembled disk jacket 22 have been featured in FIGS. 1 and 3 for clarity to reduce the number of phantom lines necessary in the illustrations.

When completely assembled, the disk jacket 22 is inserted into a so-called disk drive which is connected to a computer system, neither of which have been illustrated. Apertures 24, 26 and 28 are provided in the disk jacket 22 to provide access of the disk drive to the disk for the purposes of rotating the disk, reading information from and writing information on the disk, and sensing the rotational position of the disk, respectively. The manner in which the disk drive performs these functions need not be discussed, as it forms no part of the present invention.

As mentioned above, the disk jacket 22, in the completely assembled condition, encloses and protects a flexible magnetic disk on which may be magnetically recorded information useful to a computer system. Such disks permit the computer to access information directly through the disk drive, thus eliminating the necessity of the user entering such information manually. Such prerecorded information is commonly referred to as "software" and, with the advent of inexpensive computers, the sale of such software has evolved into a significant business. Software packages, which include one or a number of such prerecorded disks, have proven extremely popular and are the subject of great competition. The cost of software packages is determined primarily by the perceived value of the information provided rather than the cost of either manufacturing the disk and the jacket or recording the information. Unfortunately, the information is easily duplicated from one disk to another. The combination of inexpensive disks and partially assembled jackets and readily available means for duplicating recorded information has spawned a large illicit market in the unauthorized duplication and sale of software packages which are not readily distinguishable from authorized counterparts.

The purpose of the present invention is to provide a partially assembled disk jacket 22 which is not easily or cannot be duplicated by those who would deprive the copyright owner of his rights in the information supplied in a software package.

The present invention deters the theft of copyrighted software by providing the disk jacket 22 with hot-stamp transfer printing or an embossment which is not easily or cannot be duplicated after the jacket 22 has been at least partially assembled.

Hot-stamp transfer printing is a process by which a thin layer of metal is attached to a surface by means of a stamping press which includes a heated pressure shoe. The metal coating is included in certain types of "roll leaf" which are commercially available for such uses as lettering and decorating. A typical roll leaf consists of the following layers in order: a disposable carrier web having a low adhesion surface, a tough, abrasion-resistant transparent polymeric protective layer releasively adhered to the low-adhesion surface, a thin-film metal coating, and a layer of heat-activatable adhesive. A hot-stamping press, through a shoe which equals the desired size of the printing, presses the roll leaf against the surface to adhere the adhesive layer, whereupon the carrier web is pulled away, leaving the adhesive, thin-film metal coating and the protective layer on the surface in the pattern of the shoe. The surface to which the foil is to be applied must be well supported and flat in order to provide good adhesion and assure that the shoe contacts the entire surface to be printed. If the surface to be printed is a plastic, the heated shoe will deform the surface slightly during the printing process. This deformation may be an indentation or smoothing of the surface.

The transfer of indicia to the outside of the disk jacket 22 by a process such as decalcomania, transfer printing or silk screen printing would provide the user, distributor and manufacturer of software packages some protection in that a potential thief would be put to the trouble of reproducing such indicia on his jackets. The degree of protection afforded by these methods, however, would be very small since little pressure is required during the processes and the processes can be accomplished upon a surface which is not entirely flat.

Hot-stamp transfer printing provides a greater degree of protection in that the surface to be printed must be flat for the roll leaf to adhere properly and, if the surface is a plastic, the printing process slightly deforms the surface.

Hot-stamp transfer printing of an area of the jacket blank 2, such as the rectangular area bounded by the line 30 and the fold lines 16 and 18, would provide a greater degree of protection than printing or decalcomania because, after the disk jacket 22 is partially assembled, the area defined by the lines 16, 18 and 30 cannot be supported against pressure in a flat condition since it will overlie a corner 32 of the bottom panel 4 and a corner 34 of the edge flap 8.

The degree of protection afforded by hot-stamp transfer printing will be significantly increased if it is applied to an area which is to be folded during the assembly process. Such an area is illustrated by the rectangular area 36 which lies over the fold line 14 between the bottom panel 4 and the top panel 6. Hot-stamp transfer printing in this area is particularly effective because after the disk jacket 22 has been partially assembled, pressure cannot be applied to the rectangular area 36 without crushing the fold at the line 14. Such a deformation of the fold line 14 would be immediately discernible upon inspection and would alert the user, distributor or manufacturer that the software package is not an authorized copy. It should be recognized that the hot-stamp transfer printing area 36 shown in FIG. 1 need not be positioned as illustrated. Printing anywhere along the fold lines 14, 16, or 20 would be equally effective and printing at the junction of two fold lines might be even more effective because of the superposition of the printing area with respect to corners of the edge flaps 8, 10 or 12.

Transfer printing across the fold line 18 would not be effective because the partially assembled jacket 22 is supplied with flap 10 in an unfolded condition. Thus, the fold line 18 could be supported in a flat condition.

The two methods of deterrent described above, i.e., transfer printing in an area which cannot be supported in a flat condition and transfer printing across an area which will contain a fold line in the assembled condition, may be effectively combined by hot stamp transfer printing an area such as that bounded by the dashed lines 38 and 40. Printing in such an area would span many regions which could not be supported flat and also would cross a number of fold lines. An attempt to duplicate such transfer printing on a partially assembled jacket 22 would result in numerous imperfect printing areas which could be easily identified.

Figure 2:
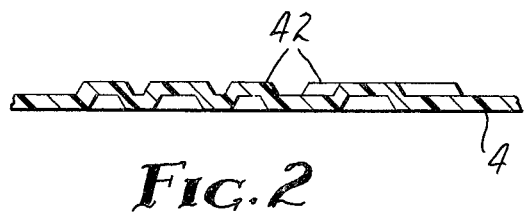
FIG. 2 is an enlarged, partial cross-sectional view of the jacket blank of FIG. 1 taken generally along the line 2—2 of FIG. 1.
Figure 4:
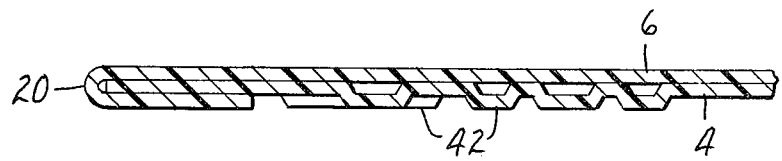
FIG. 4 is an enlarged, partial cross-sectional view of the partially assembled disk jacket of FIG. 3 taken generally along the line 4—4 of FIG. 3.

FIG. 1 also illustrates a method of deterring duplication which may perhaps be even more effective than hot-stamp transfer printing. In this method, suitable indicia 42 is embossed into the bottom panel 4 to deform the panel 4 into raised letters as shown in FIG. 2. The difficulty in reproducing the embossed letters 42 is illustrated by FIG. 4 which shows the bottom panel 4 superposed over the top panel 6, as would be the case in a partially assembled disk jacket 22. Any attempt to produce the raised letters 42 on the bottom panel 4 after the jacket 22 is partially assembled would require that the embossing die also deform the top panel 6 into a negative, recessed image of the raised letters 42. Such deformation of the top panel 6 would provide an immediate indication that the jacket 22 is not an authorized duplicate.

Embossing the jacket blank 2 prior to forming the blank 2 into the partially assembled disk jacket 22 would be effective if the embossment were located anywhere on the top panel 6, the bottom panel 4 or side flaps 8 or 12. Any of these locations would be effective because all of these areas overlie another layer of the material which comprises the disk jacket 22. Embossing the edge flap 10 would, of course, not be effective because the flap 10 overlies no other portion of the jacket 22 in the partially assembled condition illustrated in FIG. 3. A potential duplicator could simply emboss the edge flap 10 prior to insertion of the disk into the jacket 22 and attachment of the flap 10 to the bottom panel 4.

The preferred location of the embossed letters 42, however, is on the bottom panel 4 adjacent one of the edge flaps 8 or 12. In these areas, the raised letters 42 will have a minimal impact on the overall thickness of the disk jacket 22.

Although the embossment 42 has been illustrated as overlying another layer of material which is flat, duplication prevention may also be accomplished by embossing both the superposed panels in opposite directions wherein each embossment extends away from the adjacent panel. The point is that the panel adjacent to the embossed panel need not be flat but must not include a negative, recessed image corresponding to the embossment.

Figure 5:
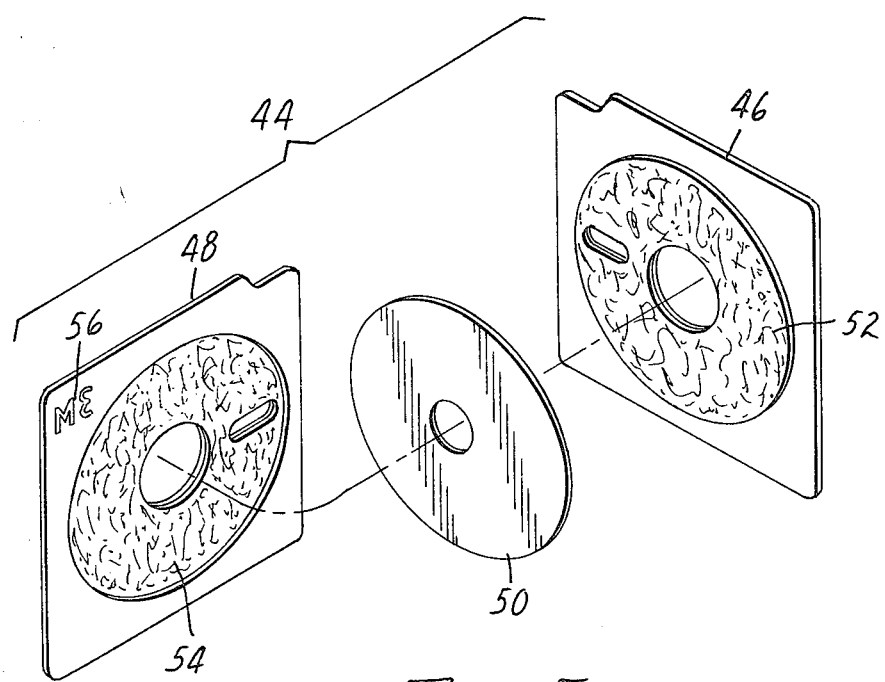
FIG. 5 is an exploded perspective view of a second construction of a magnetic disk jacket which includes the present invention.
Figure 6:
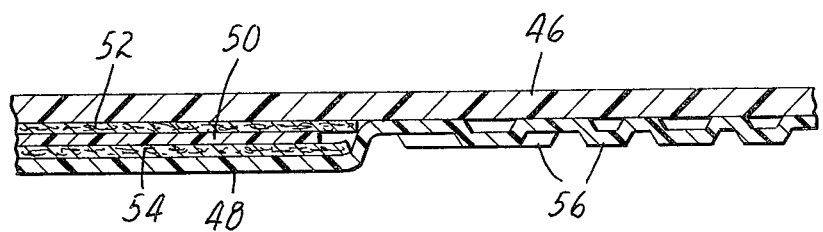
FIG. 6 is an enlarged, partial cross-sectional view of the assembled disk jacket of FIG. 5.

FIGS. 5 and 6 illustrate how the above-described methods of deterring duplication could be applied to a disk jacket 44 which is constructed by a method other than folding a jacket blank 2. The disk jacket 44 is disclosed in U.S. Pat. No. 3,864,755 and includes a flat back cover 46 and a relatively thin front cover 48 which is thermoformed to accept a disk 50 and bonded to the back cover 46. Fiber wiper layers 52 and 54 are interposed between the surfaces of the disk 50 and the front 48 and back 46 covers to clean the disk 50 and prevent the edge of the disk 50 from becoming wedged in the junction of the front 48 and back 46 covers. Hot-stamp transfer printing would be ineffective if applied to a laminated structure such as the jacket 44 because the areas around the disk 50 can be easily supported after assembly in a flat condition and because there are no fold lines which may be crushed by transfer printing after assembly. Embossment, however, of raised lettering 56 would be extremely effective because, as is the case with folded jackets 22, the embossment 56 cannot be added after assembly of the jacket 44 without deforming the panel adjacent the panel which includes the embossment 56. Thus, a negative, depressed image of the embossment 56 opposite the raised portion would indicate that the jacket 44 was not an authorized product. The embossment 56 is illustrated as being formed in the front panel 48 because this is the area in which raised letters 56 would have the least impact on the overall thickness of the assembled disk jacket 44. However, the embossment 56 could be located on any portion of either the back cover 46 or the front cover 48 and perform equally effectively as a deterrent to duplication.

Although the embossment 56 is illustrated in conjunction with a disk jacket cover 48 which is thermoformed to provide space for the disk 50, the principle of the present invention could be equally well applied to a disk jacket which is constructed of three sheets which include a central gasket layer surrounding the disk and adhesively attached to flat side panels, as disclosed in U.S. Pat. No. 3,668,658, by embossing one of the side panels before attaching the gasket layer.

It will be appreciated that the above-described means for deterring duplication of computer software packages have in common the deformation of an area of the disk jacket in a manner which would be difficult or impossible to duplicate after the jacket has been at least partially assembled. This is accomplished by either hot-stamp transfer printing, prior to assembly, an area of the jacket blank which cannot be supported against pressure, after the jacket is at least partially assembled, such that the area remains planar or embossing the jacket blank to produce an embossment which will be located adjacent a flat superposed panel after the jacket is at least partially assembled and which will extend away from the superposed panel.

The method of forming a non-duplicable disk jacket can, therefore, be reduced to providing a flat stock material, deforming an area of the stock by either hot-stamp transfer printing or embossing, cutting the stock material to produce a disk jacket blank which includes the printing or embossment in a desired area, and at least partially assembling the jacket blank.

Although the jacket blank 2, illustrated in FIG. 1, and the partially assembled jacket 22, illustrated in FIG. 3, have been shown for convenience as incorporating all of the various means for deterring duplication described above, it should be recognized that only one of the means described would normally be incorporated into a commercially produced disk jacket 22.

While the method described above will be effective in deterring the person who would steal copyrighted material by duplicating a software package from available "raw" materials, i.e., blank disks and unmarked disk jackets, there is another mode of theft which must be addressed.

If disk jackets 22 were provided with an area which has been hot-stamp transfer printed or embossed in the manner described above with the software manufacturer's name, for example, duplication of the package from blank materials would be effectively prevented. It would still be possible for a person bent on theft to purchase an inexpensive software package from the software manufacturer, erase the recorded material and record more expensive software material on the already packaged disk. This erasure and recording could be accomplished through the read/write aperture 26 and so the disk jacket 22 would not have to be disassembled. The thief would thus acquire an authentic jacket 22 and be able to sell an expensive software package for the cost of an inexpensive software package. Substitution of software within an authentic jacket 22 can be prevented if the transfer printed or embossed area somehow relates to and identifies the information which should be contained on the disk.

This identification can be in the form of a code, such as the bar codes utilized to identify consumer products, a particular number associated with a particular software package, or a written description of the information which should be present on the disk.

The invention above, therefore, lends itself not only to the prevention of duplication of the jacket 22, but also to the identification of the information provided and the prevention of substitution of such information.

The present invention has been applied, in this description, solely to a magnetic disk jacket. It is contemplated, however, that the invention has general utility in such areas as the envelope industry or any field in which it is desired to prevent the duplication of an object which will have superposed panels after assembly.

While the present invention has been described with reference to certain particular embodiments, it is to be understood that the invention is not to be limited to the specific means. It may be embodied in other ways that will suggest themselves to persons skilled in the art. It is believed that this invention is new and that any departures from the above description that come within the scope of the following claims are to be considered as part of the invention.

I claim:

1. A method of forming a duplication-resistant disk jacket adapted to receive and enclose a magnetic recording disk comprising the steps of:
    providing a flat paper or polymer stock material;
    perimeter cutting said stock material to produce a jacket blank;
    partially assembling said jacket blank to form a partially-assembled disk jacket;
    imparting indicia to one surface of said jacket blank prior to partially assembling said jacket blank in an area and in a manner which cannot be duplicated in a partially-assembled disk jacket not provided with said indicia prior to partially assembling said jacket blank;
    inserting said magnetic recording disk into said partially-assembled disk jacket; and
    assembling completely said jacket blank to form an assembled, duplication-resistant disk jacket enclosing said magnetic recording disk.

2. The method of claim 1 wherein said partially assembling and assembling is accomplished by folding said jacket blank along predetermined fold lines.

3. The method of claim 2 wherein said indicia is hot-stamp transfer printing.

4. The method of claim 3 wherein said hot-stamp transfer printing spans at least one of said predetermined fold lines.

5. A jacket adapted to receive a magnetic recording disk and which is partially assembled in that the jacket includes first and second superimposed panels secured to each other and each panel having inner surfaces adjacent each other and outer surfaces, the improvement comprising:
    an embossment in at least said first panel recessed into said inner surface and raising said outer surface, the second panel not including a corresponding embossment recessed into said outer surface and raising said inner surface in the area thereof opposite the embossment in said first panel such as would occur if said superposed panels were embossed as a laminated structure in said superposed relationship, whereby said disk jacket is distinct from other partially assembled disk jackets formed without a said embossment and may be distinguished from other disk jackets wherein said embossment is added after partial assembly.

6. A jacket according to claim 5 wherein said first and second panels both include embossments recessed into said inner surfaces and raising said outer surfaces.

7. A jacket according to claim 5 wherein said second panel is flat adjacent said embossment in said first panel.

8. A jacket according to claim 5 wherein said embossment includes means for identifying the information recorded on the disk.

9. An improved jacket for a magnetic recording disk, the jacket being the type which is formed from a single sheet of paper or polymeric material including a bottom panel, a top panel and edge flaps extending from the top panel by folding said sheet at a fold line between said top and bottom panels so that said top panel overlies said bottom panel, folding said sheet at fold lines between the top panel and the edge flaps so that said flaps overlie said bottom panel, and securing the edge flaps to the bottom panel, the improvement comprising:
    printing which crosses at least one of said fold lines, said printing extending from said top panel and around at least one of said fold lines after said jacket is folded, whereby said printing is positioned in an area on said jacket such that said printing cannot be duplicated on a previously formed disk jacket rendering said previously formed disk jacket duplication resistant in that said printing cannot be applied to said jacket after said jacket is folded and said flaps secured.

10. An improved jacket according to claim 9 wherein said printing crosses said fold line between said top and bottom panels.

11. An improved jacket according to claim 9 wherein said printing crosses at least one of said fold lines between said top panel and said edge flaps.

12. An improved jacket according to claim 9 wherein said printing is a hot-stamp transfer printed area.

13. An improved jacket according to claim 12 wherein said printed area includes means for identifying the information recorded on the disk.

* * * * *